United States Patent
Yuan et al.

(10) Patent No.: US 8,583,691 B2
(45) Date of Patent: Nov. 12, 2013

(54) METHOD FOR VIEWING DOCUMENT INFORMATION ON A MOBILE COMMUNICATION DEVICE

(75) Inventors: Jainwei Oliver Yuan, Cumming, GA (US); Olav A. Sylthe, Oslo (NO); Dan Dumitru, Atlanta, GA (US)

(73) Assignee: Blackberry Limited, Waterloo (CA)

( * ) Notice: Subject to any disclaimer, the term of this patent is extended or adjusted under 35 U.S.C. 154(b) by 0 days.

(21) Appl. No.: 13/191,705

(22) Filed: Jul. 27, 2011

(65) Prior Publication Data

US 2012/0023181 A1    Jan. 26, 2012

Related U.S. Application Data

(63) Continuation of application No. 10/930,486, filed on Aug. 31, 2004, now abandoned.

(51) Int. Cl.
*G06F 7/00* (2006.01)
*G06F 17/30* (2006.01)

(52) U.S. Cl.
USPC .......................................................... 707/790

(58) Field of Classification Search
USPC .......................................................... 707/790
See application file for complete search history.

(56) References Cited

U.S. PATENT DOCUMENTS

| | | | |
|---|---|---|---|
| 5,848,418 A * | 12/1998 | de Souza et al. | 1/1 |
| 6,160,554 A | 12/2000 | Krause | |
| 6,226,642 B1 | 5/2001 | Beranek et al. | |
| 6,256,666 B1 | 7/2001 | Singhal | |
| 6,300,947 B1 | 10/2001 | Kanevsky | |
| 6,360,252 B1 * | 3/2002 | Rudy et al. | 709/206 |
| 6,438,585 B2 | 8/2002 | Mousseau et al. | |
| 6,556,217 B1 | 4/2003 | Makipaa et al. | |
| 6,768,999 B2 * | 7/2004 | Prager et al. | 1/1 |
| 6,895,550 B2 * | 5/2005 | Kanchirayappa et al. | 715/229 |
| 7,712,027 B2 | 5/2010 | Yuan et al. | |
| 2002/0129277 A1 | 9/2002 | Caccavale | |
| 2002/0161796 A1 * | 10/2002 | Sylthe | 707/500 |
| 2003/0023628 A1 | 1/2003 | Girardot et al. | |
| 2003/0236821 A1 | 12/2003 | Jiau | |
| 2004/0133854 A1 | 7/2004 | Black | |
| 2004/0139397 A1 | 7/2004 | Yuan et al. | |
| 2004/0148571 A1 | 7/2004 | Lue | |

(Continued)

FOREIGN PATENT DOCUMENTS

| | | |
|---|---|---|
| WO | 0244948 | 6/2002 |
| WO | 2004042507 | 5/2004 |

OTHER PUBLICATIONS

University of Washington. "Pine Information Center—Security." http://www.washington.edu/pine/faq/security.html. Apr. 16, 2003. 3 pages.*

(Continued)

*Primary Examiner* — Charles Lu
(74) *Attorney, Agent, or Firm* — Novak Druce Connolly Bove +Quigg LLP (57) ABSTRACT

A process for viewing document information on a mobile communication device without having to retrieve the full document onto the device. The solution is client-server based. The client is the mobile device attachment viewing application and the server is the document (attachment) handling process on a remote machine. The process comprises server document information construction and delivery, and document information display on the mobile device.

23 Claims, 11 Drawing Sheets

(56) References Cited

U.S. PATENT DOCUMENTS

2004/0239681 A1 12/2004 Robotham et al.
2005/0039034 A1 2/2005 Doyle et al.
2005/0066037 A1 3/2005 Song et al.
2005/0200610 A1 9/2005 Skantze et al.
2006/0056334 A1 3/2006 Yuan et al.

OTHER PUBLICATIONS

Berks, Jem E. renattach 1.2.1—Filter that renames/deletes dangerous e-mails attachments Copyright (C) 2003, 2004, http://web.archive.org/web/20040806180811/www.pc-tools.net/uni . . . .

Summons to attend oral proceedings pursuant to Rule 115 (1) EPC for corresponding European Application No. 04104180.7-2201-1630690.

Rodriguez, et al. IBM Redbooks: New Capabilities in IBM WebSphere Transcoding Publisher Version 3.5 Extending Web Applications to the Pervasive World, May 2001.

Rivest, R. The MD5 Message-Digest Algorithm, MIT Laboratory for Computer Science and RSA Data Security Inc., Apr. 1992. pp. 18.

M.G. Schultz, MEF: Malicious Email Filter—A UNIX Mail Filter that detects malicious windows executables Jun. 30, 2001. Proceedings of the Freenix track: 2001 Usenix Annual Technical Conference, Boston, Mass., USA XP002300865. 9pg.

On Demand Retrieval of attached file in mail system, IBM Technical Disclosure Bulletin, IBM, Corp, New York, USA vol. 41, No. 1 Jan. 1998, p. 623, XP000772234, ISSN: 0018-8689. pp. 10.

Borenstein et al. RFC 1521:MIME (Multipurpose Internet Mail Extensions) Part One : Mechanisms for Specifying and describing the format of Internet Message Bodies, Network Working Group Request for Comments, XX, XX Sep. 1993, pp. 1-44, XP002260361.

iGrilliot research. White paper: Wireless Access to email attachments and documents. 2001. 16 pages.

\* cited by examiner

This document has subdocument of images like this one .

Second paragraph contains the same image .

| Icon | Attachment Type | Supported Sub document types |
|---|---|---|
| | Archives | ZIP Archives. Only used in Attachment List Screen |
| | Documents | MS Word, Adobe PDF, Corel WordPerfect, ASCII Text, HTML |
| | Spreadsheets | MS Excel |
| | Presentations | MS PowerPoint |
| | Images | BMP, PNG, GIF, TIFF, JPEG |

Figure 7B

Attachments: 4
- 0001.tmp
- 0002.tmp
- 0003.tmp
- 0004.tmp

FIG. 8A

Attachments: 4
- 0001.tmp
- 0002.tmp
- 0003.tmp
- 0004.tmp

0004.tmp
Original Size: 75 Kb
Author: Florian Popescu
Title: 1 Introduction
Date of Creation: 2001/2/7 14:59:00
Date Last Saved: 2002/8/15 15:00:00

FIG. 8B

METHOD FOR VIEWING DOCUMENT INFORMATION ON A MOBILE COMMUNICATION DEVICE

CROSS-REFERENCE TO RELATED APPLICATION

This application is a continuation of U.S. application entitled Method for Viewing Document Information on a Mobile Communication Device having Ser. No. 10/930,486, filed Aug. 31, 2004, and incorporated by reference herein.

FIELD

The following is directed in general to displaying content on mobile communication devices, and more particularly to a method for viewing document information about a document, on a mobile communication device, without having to retrieve the full document onto the device.

BACKGROUND

Mobile communication devices are becoming increasingly popular for business and personal use due to a relatively recent increase in number of services and features that the devices and mobile infrastructures support. Handheld mobile communication devices, sometimes referred to as mobile stations, are essentially portable computers having wireless capability, and come in various forms. These include Personal Digital Assistants (PDAs), cellular phones and smart phones. While their reduced size is an advantage to portability, bandwidth and processing constraints of such devices present challenges to the downloading and viewing of documents, such as word processing documents, tables and images. Also, as a result of their enhanced levels of functionality and computing power, handheld mobile communication devices are increasingly susceptible to attack by computer viruses.

Computer hackers commonly use email attachments as virus carriers to attack corporate network-connected computers. Therefore, email attachments are often identified as presenting a security threat for corporate networks. In order to protect such networks, many corporations and organizations use sophisticated systems to safely handle email attachments. One of the more common corporate approaches is to employ document management systems. One feature of such systems is that they usually rename email attachments with a common extension, for example ".tmp".

When the user of a mobile device receives an email with renamed attachments it is difficult for the user to determine which attachment is of interest based on file names alone. For example, if a mobile device user receives an email with attachments named 0001.tmp, 0002.tmp and 0003.tmp, and only one of them is a MS WORD® document that is of interest, the user is unable to identify the document from the common file extensions. The normal recourse in such a situation is to retrieve the document contents for all attachments from the remote document server, and successively review the documents in order to identify the desired one.

However, the downloading of an entire document from the server to a mobile communication device consumes a large amount of bandwidth, especially when the document is large. In addition, viewing even a portion of such a downloaded document on the device consumes substantial device CPU/memory/battery resources.

SUMMARY

According to an aspect of this specification, a method is set forth for viewing document information on a mobile communication device (e.g. type, creation time, etc), without having to retrieve the full document onto the device. The solution is client-server based. The client is the mobile device attachment viewing application and the server is the document (attachment) handling process on a remote machine. This method includes two operational steps: server document information construction and delivery, and document information display on the mobile device.

By using the method set forth herein, a user is able to identify a document of interest, without retrieving the document content from the server for each attachment in an email. This minimizes bandwidth usage and provides an enhanced on-demand attachment viewing experience. Also, eliminating unnecessary document content transmission to the device minimizes device power consumption.

Additional aspects and advantages will be apparent to a person of ordinary skill in the art, residing in the details of construction and operation as more fully hereinafter described and claimed, reference being had to the accompanying drawings.

BRIEF DESCRIPTION OF THE DRAWINGS

A detailed description of the preferred embodiment is set forth in detail below, with reference to the following drawings.

DETAILED DESCRIPTION OF THE PREFERRED EMBODIMENT

Figure 1:
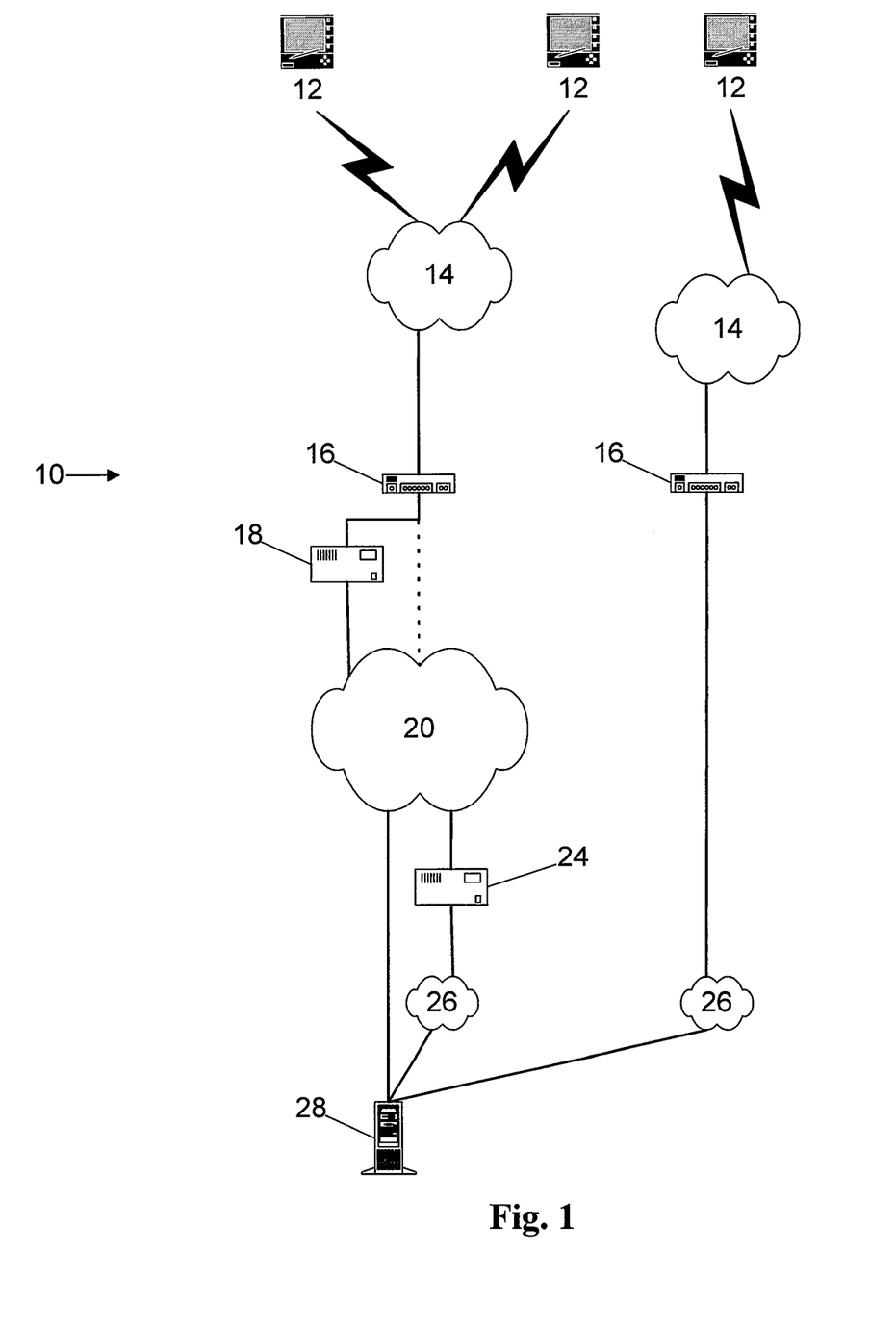
FIG. 1 is a block diagram of a network environment in which the preferred embodiment may be practiced.

With reference to FIG. 1, network environment 10 is shown in which the preferred embodiment may be practiced. Network environment 10 includes mobile devices 12 communicating via a wireless network 14 to a server 28 for downloading document attachments to the mobile devices 12. While only one server 28 is shown for illustration purposes, a person of skill in the art will understand that network environment 10 could have many such servers for hosting web sites or graphic download sites, providing access to picture files such as JPEG, TIFF, BMP, PNG, SG1, MP4, MOV, GIF, SVG, etc. As would be understood by one of ordinary skill in the art, wireless network 14 may be a GSM/GPRS, CDPD, TDMA, iDEN Mobitex, DataTAC network, or a future network such as EDGE or UMTS, or a broadband network such as Bluetooth and variants of 802.11.

A connection to a fixed service requires special considerations, and may require special permission as authorized through a Network Access Point (NAP) 16. For generic services, such as web access, a proxy-gateway or Network Address Translator (NAT) 18 may be provided so that a network operator can control and bill for the access. NATs 18 enable management of a limited supply of public Internet addresses for large populations of wireless mobile devices. Solutions offered by a proxy-gateway or NAT 18 often involve a complex infrastructure, and thus may be managed by value-added service providers (VASPs), which provide, for instance, WAP gateways, WAP proxy gateway solutions, multi-media messaging servers (MMS) and Internet Multi-Media Services (IMS).

Private Intranet services 26 may require an associated Private Intranet Proxy Gateway 24 for accessing content on server 28. Such private services include WML access to corporate mail systems, HTML access to CRM databases, or any other services that deliver information as formatted data with links and URLs embedded. As shown, it is possible that a private service 26 may be connected directly to the wireless network 14, as opposed to being connected via Internet 20.

Referred to throughout this document, for the purpose of describing the preferred embodiment, is the structure of a Document Object Model (DOM) for a document attachment to be viewed on a mobile device 12.

The attachment server 28 uses a file-parsing distiller in the preferred embodiment, for a specific document type, to build an in-memory Document Object Model (DOM) structure representing an attachment of that document type. The document DOM structure is stored in a memory cache of server 28, and can be iterated bi-directionally.

Figure 2:
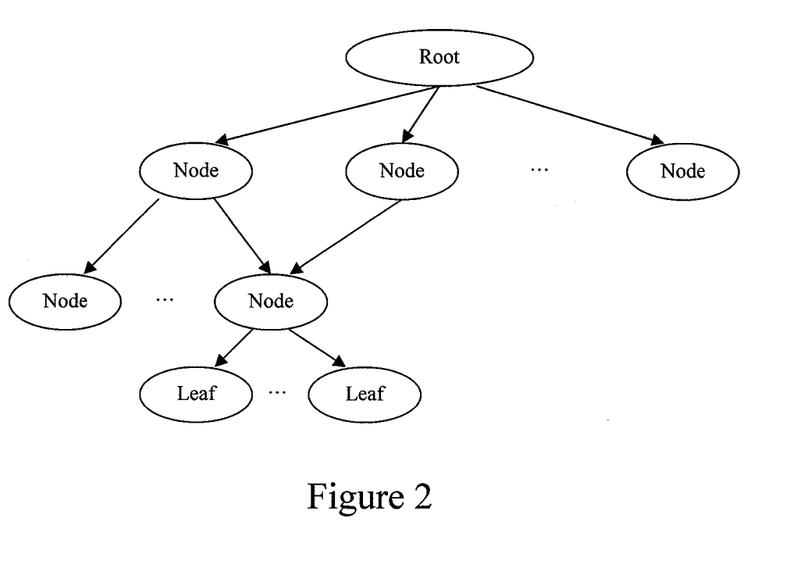
FIG. 2 is a tree diagram showing the basic structure of a Document Object Model (DOM) used in the preferred embodiment.

As shown in FIG. 2, the graph-based document DOM structure consists of nodes and leaves. The nodes serve as the parents of leaves and nodes, while leaves are end points of a branch in the graph. Each node and leaf can have a set of attributes to specify its own characteristics. For example, a paragraph node can contain attributes to specify its alignment, style, entry of document TOC, etc. In addition, each of the nodes and the leaves has a unique identifier, called a DOM ID, to identify itself in the document DOM structure.

The document DOM structure is divided into three parts: top-level, component and references. The top level refers to the document root structure, while the main document is constructed in the component and the references represent document references to either internal or external sub-document parts. The following paragraphs examine each part in detail.

Figure 3:
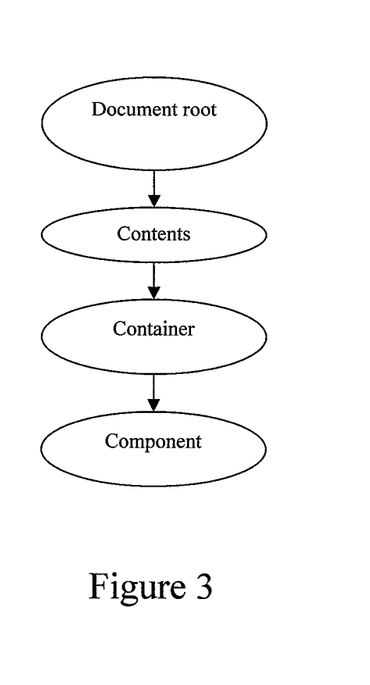
FIG. 3 shows the top-level of the DOM structure in FIG. 2.

The root node of a document DOM structure, referred to as "Document", contains several children nodes, referred to as "Contents", which represent different aspects of the document contents. Each "Contents" node contains one or multiple "Container" nodes used to store various document global attributes. The children of the "Container" nodes are components, which store the document structural and navigational information. When the attachment server 28 builds the DOM structure for an attachment file for the first time, the top-level structure is a single parent-child chain as shown in FIG. 3:

Three types of components are defined by the attachment server 28: text components, table components and image components, which represent text, tables and images in a document, respectively. The text and table components are described in detail below, and the image component structure is identical.

A component consists of a hierarchy of command nodes. Each command represents a physical entity, a property, or a reference defined in a document. For the text component, the physical entity commands are page, section, paragraph, text segments, comments, footnote and endnote commands, which by name define the corresponding entity contained in a document. The property commands for the text component are font, text color, text background color, hyperlink start/end and bookmark commands. The text component has only one reference command, referred to as the text reference command, which is used to reference a subdocument defined in the main body of a document. Usually, the children of a text component are page or section command nodes that, in turn, comprise a set of paragraph command nodes. The paragraph command can contain one or multiple nodes for the remaining command types.

Figure 4:
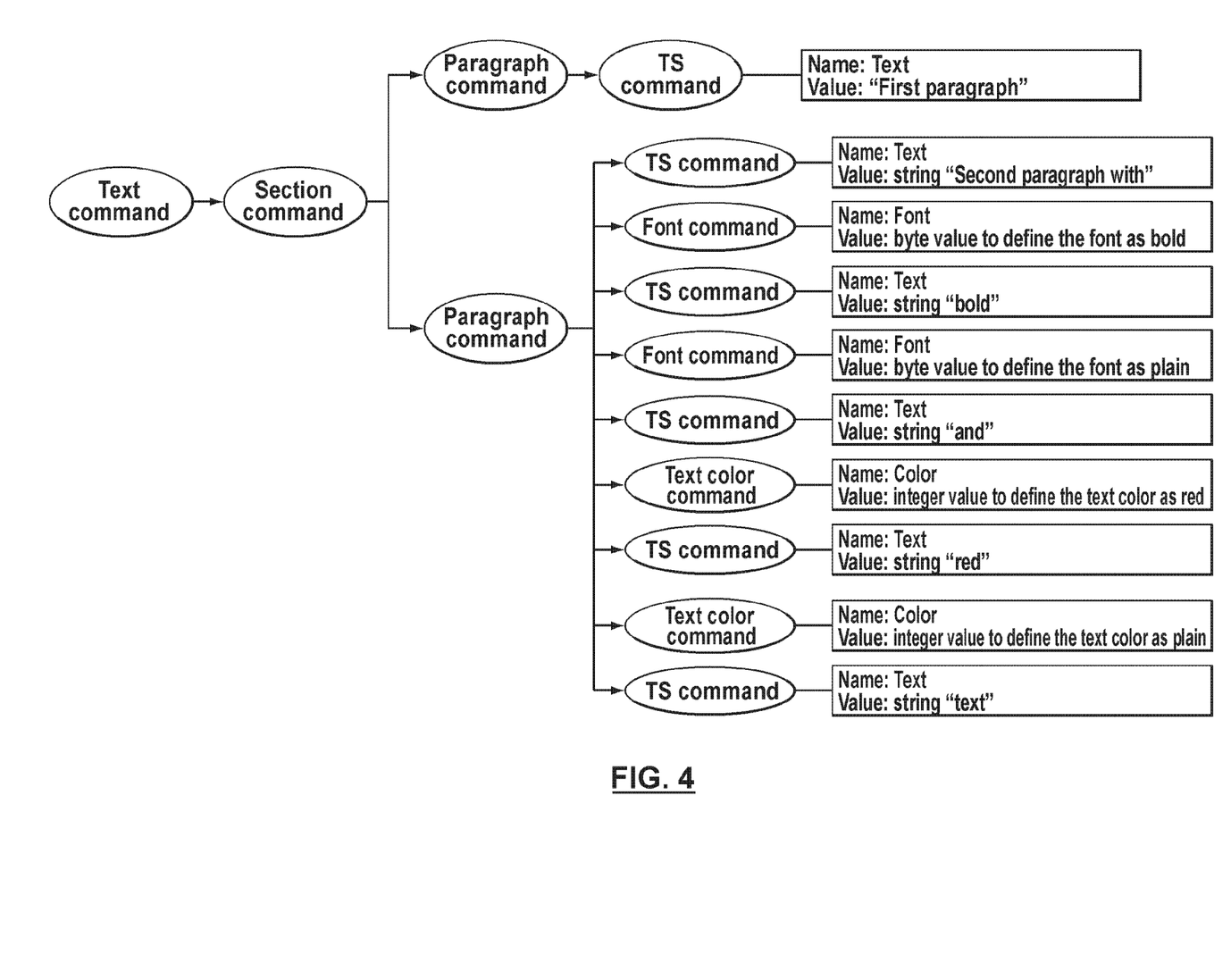
FIG. 4 shows an exemplary DOM structure for a word processing document.

Using the following sample text document, the corresponding document DOM structure is shown in FIG. 4:

| First paragraph. |
| Second paragraph with bold and red text. |

As FIG. 4 demonstrates, the section command, which is the child of the text component, consists of two paragraph commands. The first paragraph command contains one text segment command and the text content for that paragraph is added as an attribute to the text segment command. The second paragraph command has a relatively more complex structure, as the text properties in the paragraph are much richer. Each time a text property (font, text color, etc) changes, a corresponding text property command is created and the change value is added to that command as an attribute. The subsequent text segment command records the text with the same text property as an attribute. As document structure gets richer and more complex, more commands of corresponding types are created and the document properties are added as attributes to those commands.

Figure 5:
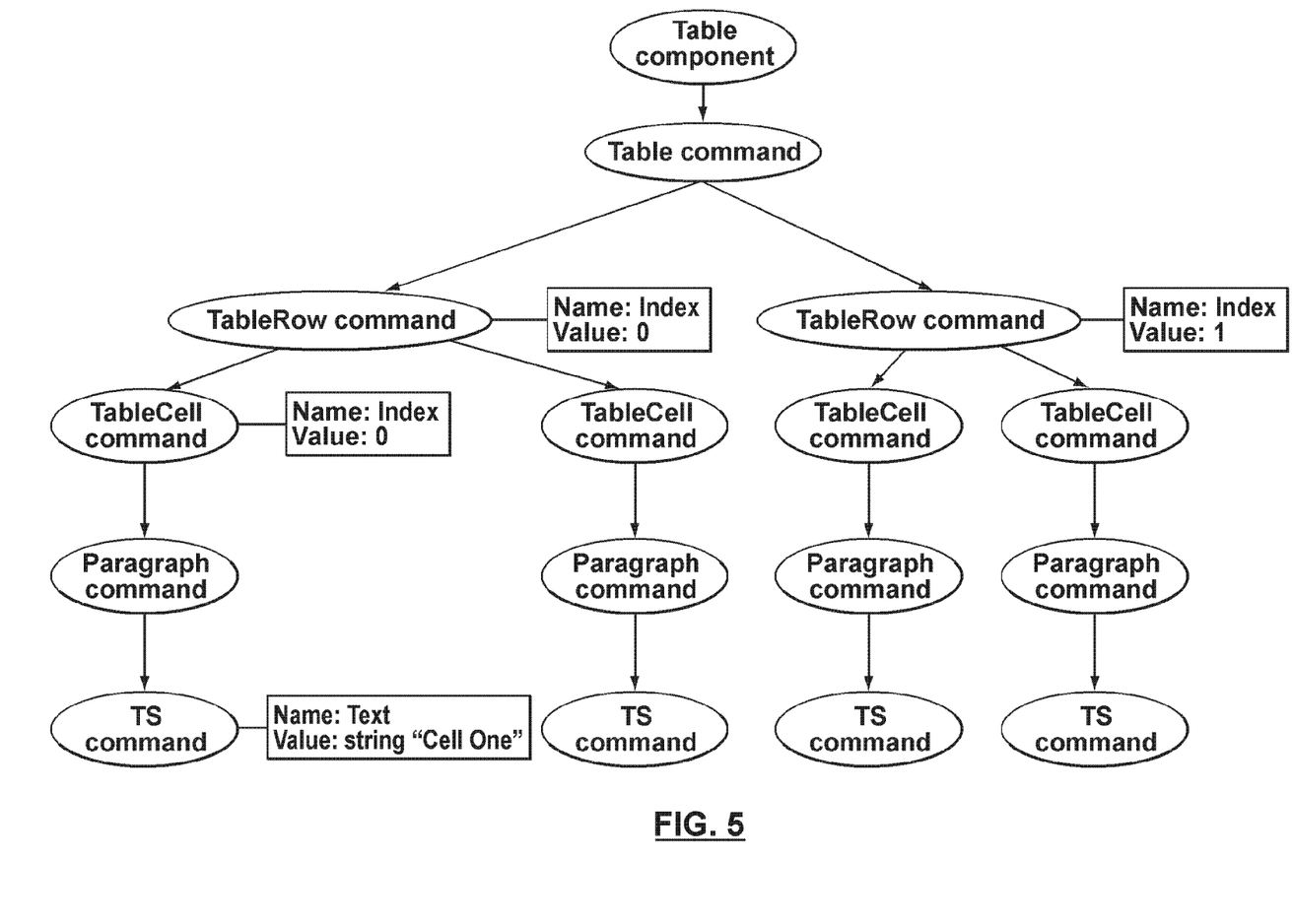
FIG. 5 shows an exemplary DOM structure for a table document.

The table component has the same three types of commands as the text component, but different command names. The document DOM structure for the sample table document below is shown in FIG. 5:

As shown in the FIG. 5, the table component has physical entity type commands of table, tablerow and tablecell, where the tablecell command can contain all available commands for the text component. In the example above, the first child TableRow command of the table command has an attribute "Index" defined by value of 0. This indicates that the indicated table row is the first one defined in the table. The attribute of the leftmost table cell command in FIG. 5 has the same meaning.

A document sometimes contains subdocuments, for example images, tables, text boxes etc. The DOM structure set forth herein uses a reference command to point to the graph of such subdocuments. Thus, for the sample document of FIG. 6a, the attachment server 28 generates the DOM structure shown in FIG. 6B.

Figure 6:
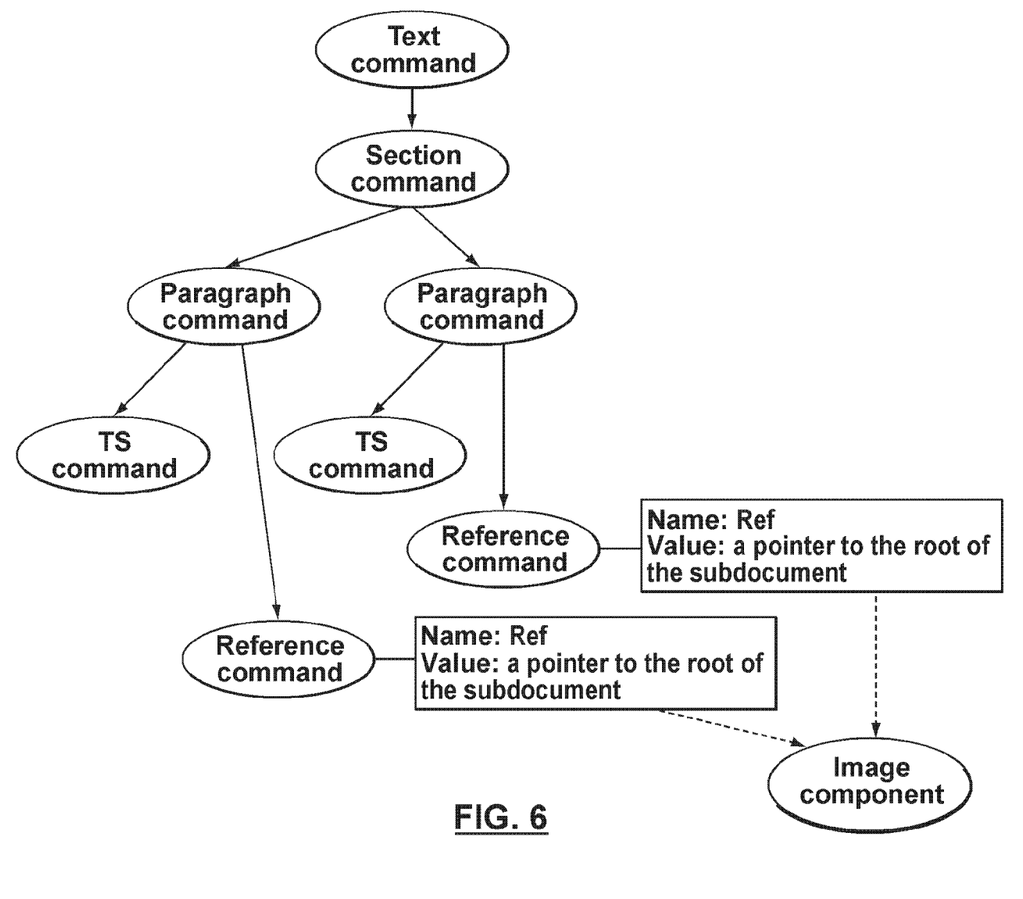
FIG. 6A shows a sample word processing document containing an image subdocument.
FIG. 6B shows an exemplary DOM structure therefore.
Figure 6A:
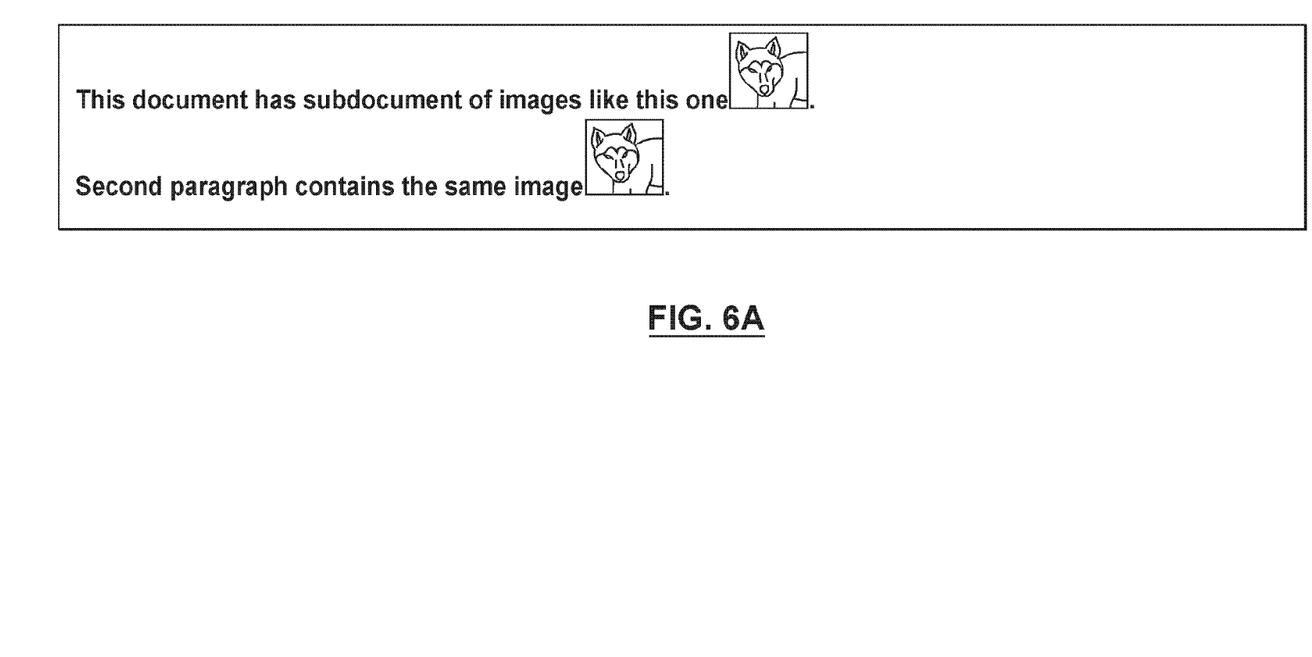
Figure 6B:
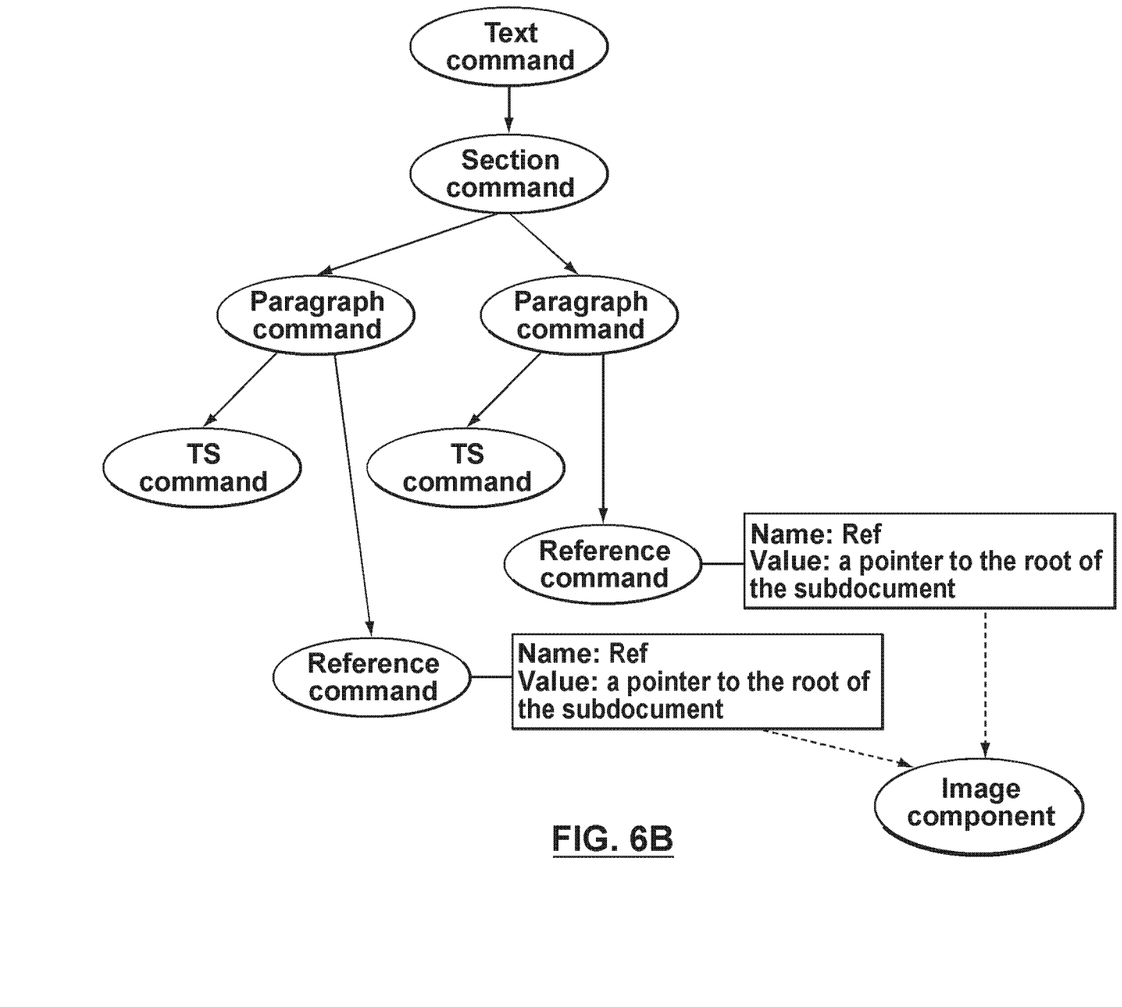

The structure shown in FIG. 6 is identical to that discussed above in connection with FIGS. 4 and 5, except for the attributes of the two reference commands. The

| Cell One   | Cell Two  |
| Cell Three | Cell Four |

OM structure for the main document, the values of the "Ref" attributes of those two reference commands point to the image component, as indicated by the dashed lines, such that the DOM structure connects together all parts of the document.

Having described the document DOM structure used to implement an embodiment of the invention, a detailed discussion will now be provided of the document information construction, delivery and display function or method according to the preferred embodiment.

Figure 7:
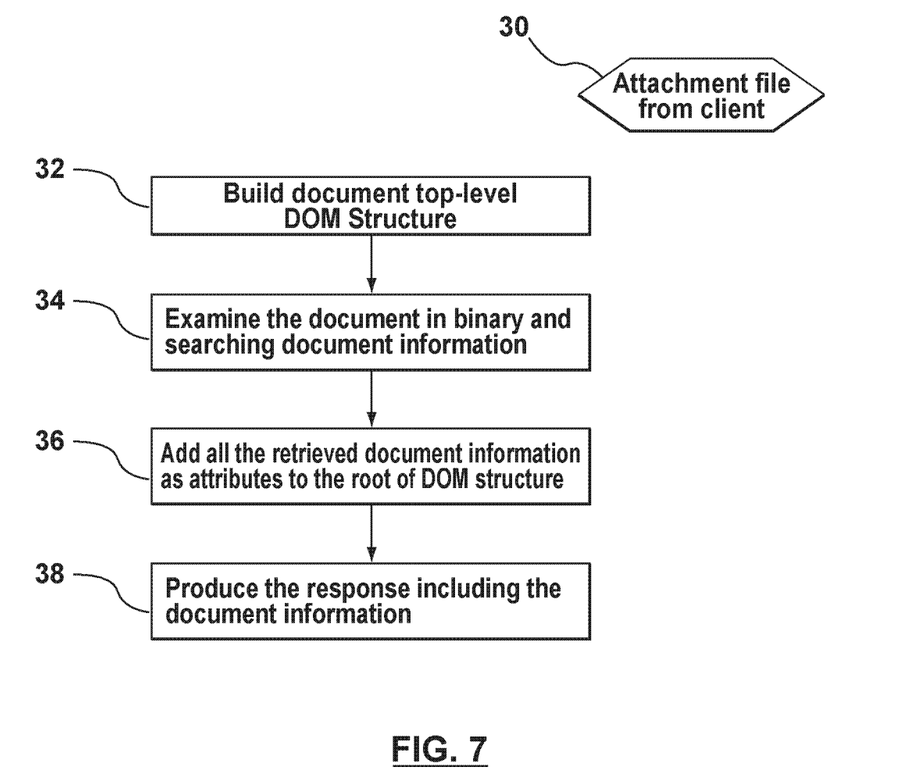
FIG. 7A is a flowchart showing document information construction and delivery according to the preferred embodiment.
FIG. 7B is a table of attachment types and associated icons.
Figure 7A:
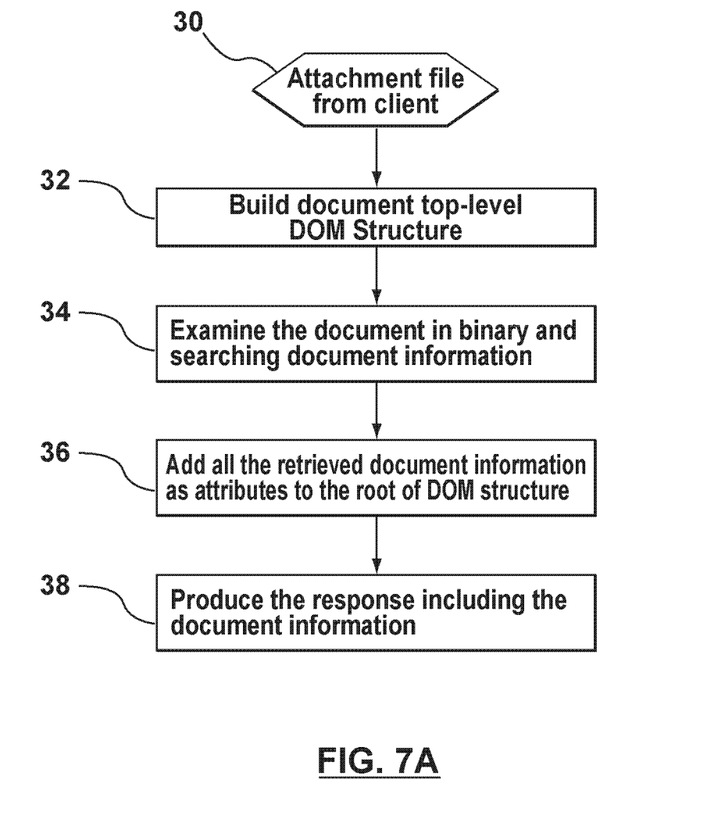

With reference to FIG. 7A, after receiving an email with renamed attachments on a mobile device 12 (step 30), the user can send a request to the server 28 for the associated document information. Once the server receives such a request, it initially constructs only the top level of the document DOM structure for the attachment (step 32), as discussed above in connection with FIG. 3. Construction of the top level of the document DOM structure is a very fast operation, thereby minimizing wait time for the user. The server 28 then examines the document binary data (step 34) to find the basic document information (i.e. type, author, creation time and date, modified time and date, format type, etc) for the document.

Specifically, the file is opened in binary mode and searched to locate a file signature. The signature of the file is stored either at the beginning or at the end of a file (usually the first or last tens to a few hundred of bytes), and is used to indicate identify the file type (i.e. document original format type, discussed in greater below). For example, the signature of the PDF document original format type, "% PDF", is contained in the first 4 bytes of the raw binary data of a PDF file. For other types of information, the binary file must be searched further.

Or, since MS Office® files are "storage" type files (rather than "stream" type files such as PDF and text file), which can contain sub-streams and sub-storage, the first 8 bytes need to be a fixed value. Therefore, after confirming that the file is "storage" type, the server 28 searches for a stream called "WordDocument" contained in the file to verify that a file is a MS Word® file.

Directly examining binary data ensures that any macro or operation in the attachment is not executed, thereby eliminating any chance of virus attacks and/or other security threats.

After retrieving all of the available document information stored in the file, the server 28 adds the retrieved information as attributes to the root component of the DOM structure (step 36).

It will be appreciated that, compared to retrieval of the entire document contents, the document information search and construction process of FIG. 7A is much simpler and quicker, especially for large documents, since the server 28 usually does not have to parse deep into the file to locate the document information. After the document information is constructed, the server 28 sends a response back to the client device 12 (step 38) over a standard transportation channel.

Figure 7B:
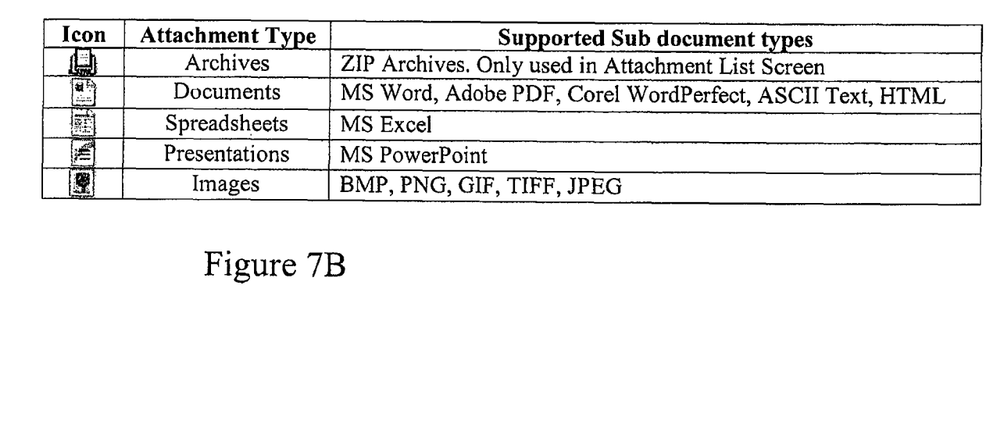

After the client device 12 receives the requested document information for an email attachment, it displays the information to the user according to type. Specifically, server 28 indicates the document original format type in five categories: Archives, Documents, Spreadsheets, Presentations and Images. These five categories are each represented by a unique icon displayed on the screen of the mobile device 12 which, according to the preferred embodiment, are illustrated in the table of FIG. 7B.

The server 28 also preferably sends the document format subtype to the mobile device 12. For example, MS Word® and Adobe® PDF are both categorized as type "documents", which is further specified by the server 28 using the different subtypes, as indicated above. In addition to the document type, other document information, such as size, creation time, last modified time and author are also sent to the client device 12.

Figure 8A:
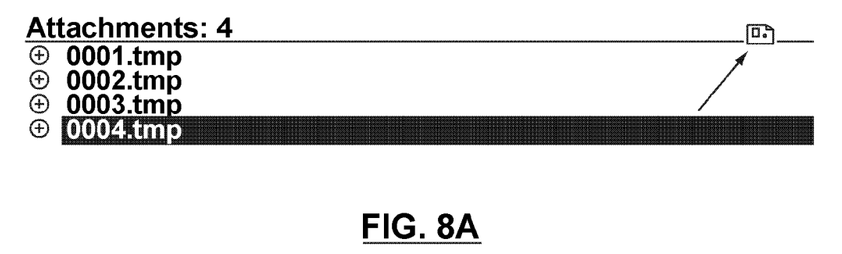
FIGS. 8A and 8B show static and dynamic display, respectively, of document information on a mobile communication device according to the preferred embodiment.
Figure 8B:
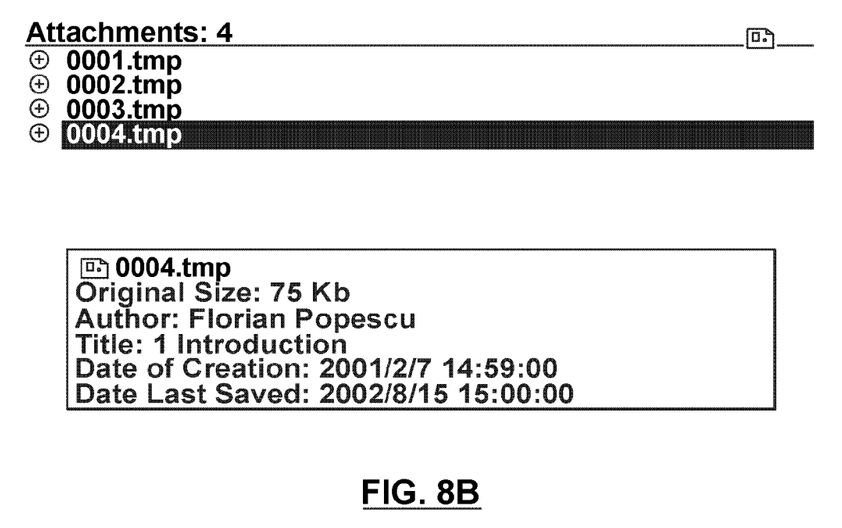

The client device 12 displays the information in a static or dynamic fashion. With static display, the client device 12 displays the information on a static area, (e.g. title bar, etc.) of the device screen. With dynamic display, the client device 12 first caches the document information and then displays it using dynamic GUI elements, (e.g. pop-up message box, etc.) in response to a query from the user.

FIG. 8A shows a static display of document type whereas FIG. 8B shows both the static display of document type and a pop-up message box for dynamic representation of the remaining document information sent from the server 28.

In summary, the method of document information delivery and display according to the preferred embodiment allows a mobile device user to quickly determine if an attachment is of interest without having to retrieve the document content itself, thereby minimizing overall network bandwidth.

A person skilled in the art, having read this description of the preferred embodiment, may conceive of variations and alternative embodiments. All such variations and alternative embodiments are believed to be within the ambit of the claims appended hereto.

What is claimed is:

1. A process for providing document information to a mobile communication device relating to an email attachment document of an email stored on a server, the process executed by the server and comprising:
   renaming said email attachment document using a temporary file extension;
   transmitting said email to said mobile communication device without transmitting said email attachment document to said mobile communication device;
   receiving from the mobile communication device a request for document information, wherein the document information includes an original document format type of the email attachment document;
   processing said email attachment document wherein said processing comprises:
   opening said email attachment document in binary mode, resulting in the prevention of any macro or operation in the email attachment document from being executed; constructing only a top level of a document structure for said email attachment document; searching said top level including binary document data; locating a file signature indicative of the original document format type; obtaining said document information according to document format type; and, adding said document information as attributes to a root component of the document structure; and
   transmitting said document information to said mobile communication device, without transmitting full content of the email attachment document.

2. The process of claim 1, wherein said processing further comprises constructing a graph structure within said server, said graph structure containing said document information.

3. The process of claim 2, wherein said constructing further comprises: creating a root node, and at least one child node storing contents of said email attachment document; determining said document information by examining said email attachment document ; retrieving said document information; and, adding said document information to said root node.

4. The process of claim 3, wherein said examining further comprises searching document binary data of said email attachment document and finding said document information.

5. The process of claim 3, wherein said document information is added to said root node and wherein said document information is an attribute of said root node.

6. The process of claim 2, wherein said graph structure is a Document Object Model (DOM).

7. The process of claim 1, wherein said displaying further comprises presenting said document information on a static screen area of said mobile communication device.

8. The process of claim 7, wherein said static screen area is a title bar.

9. The process of claim 1, wherein said displaying further comprises caching and then presenting said document information using GUI elements on a dynamic screen area of said mobile communication device.

10. The process of claim 9, wherein said GUI elements include a pop-up message box.

11. A process for generating document information at a server for transmitting to a mobile communication device relating to an email attachment document of an email stored on the server, the process comprising the steps performed by the server of:
   renaming said email attachment document using a temporary file extension;
   transmitting said email to said mobile communication device without transmitting said email attachment document to said mobile communication device;
   receiving a request for document information from said mobile communication device, wherein the document information includes an original document format type of the email attachment document;
   processing said email attachment document wherein said processing comprises: opening said email attachment document in binary mode, resulting in the prevention of any macro or operation in the email attachment document from being executed; constructing only a top level of a document structure for said email attachment document; searching said top level including binary document data; locating a file signature indicative of the original document format type; obtaining said document information according to document format type; and, adding said document information as attributes to a root component of the document structure; and
   transmitting said document information to said mobile communication device, without transmitting full content of the email attachment document.

12. The process of claim 11, wherein said processing further comprises constructing a graph structure within said server, said graph structure containing said document information.

13. The process of claim 12, wherein said constructing further comprises: creating a root node, and at least one child node storing contents of said email attachment document; determining said document information by examining said email attachment document; retrieving said document information; and, adding said document information to said root node.

14. The process of claim 13, wherein said examining further comprises searching document binary data of said email attachment document and finding said document information.

15. The process of claim 13, wherein said document information is added to said root node and wherein said document information is an attribute of said root node.

16. The process of claim 12, wherein said graph structure is a Document Object Model (DOM).

17. A process for receiving document information for display on a mobile communication device, said document information relating to an email attachment document of an email stored on a server, the process comprising the steps performed by the mobile communication device of:
   receiving said email without the email attachment document from said server, said email attachment document having been renamed by said server using a temporary file extension;
   transmitting a request for document information including the original document format type to said server such that said server: opens said email attachment document in binary mode, resulting in the prevention of any macro or operation in the email attachment document from being executed; constructs only a top level of a document structure for said email attachment document; searches said top level including binary document data; locates a file signature indicative of the original document format type; obtains said document information according to document format type; and, adds said document information as attributes to a root component of the document structure;
   receiving said document information from said server; and
   displaying said document information according to the document format type without retrieving full content of the email attachment document onto the mobile communication device.

18. The process of claim 17, wherein said document information comprises a graph structure containing said document information.

19. The process of claim 17, wherein said received document information is statically or dynamically displayed on said mobile communication device.

20. The process of claim 19, wherein said statically displaying further comprises presenting said document information on a static screen area of said mobile communication device where said static screen area is a title bar.

21. The process of claim 19, wherein said dynamically displaying further comprises caching and then presenting said document information using GUI elements on a dynamic screen area of said mobile communication device.

22. The process of claim 20, wherein said GUI elements include a pop-up message box.

23. The process according to claim 1, wherein said document information includes any of (i) document original format type including any one or more of Archives, Documents, Spreadsheets, Presentations and Images represented on said mobile device by respective icons, (ii) format subtype for identifying a unique software application, and (iii) other document information including at least one of size, creation time, last modified time and author.

\* \* \* \* \*